Sept. 8, 1959 L. J. KELLY, JR 2,902,821
FASTENER JOINT FOR SPANGLES AND OTHER MEMBERS OF
FLEXIBLE RESILIENT MATERIAL
Filed Nov. 1, 1954 2 Sheets-Sheet 1

Inventor:
Leo J. Kelly, Jr.
By Leonard Niemo
Attorney

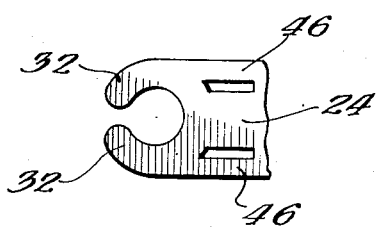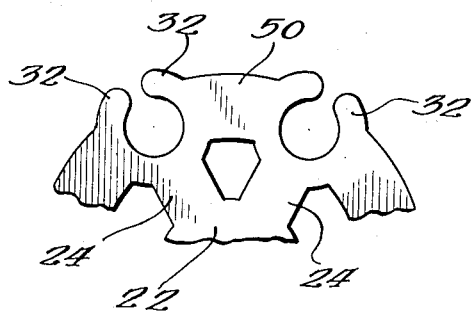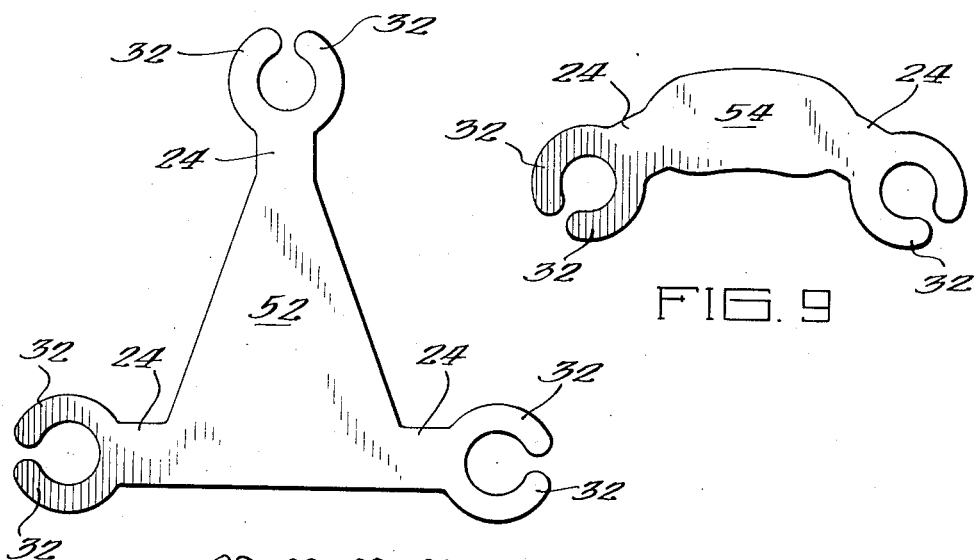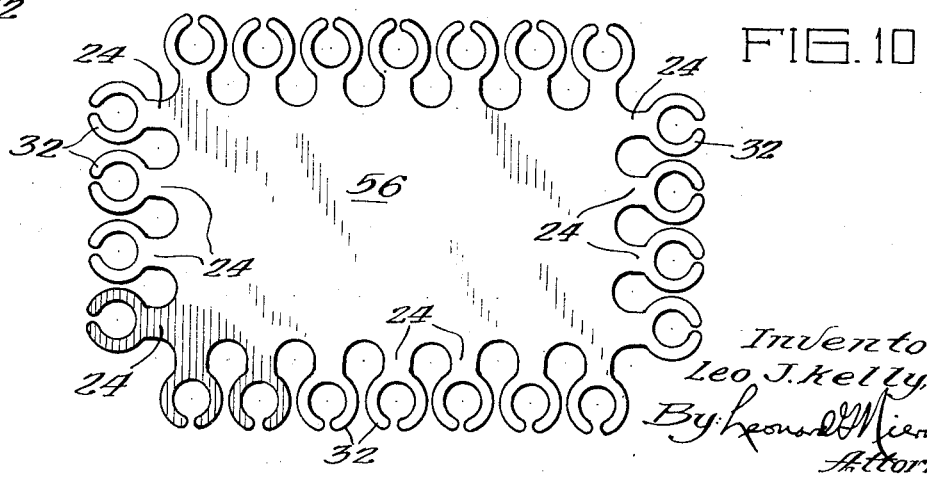

United States Patent Office 2,902,821
Patented Sept. 8, 1959

2,902,821

FASTENER JOINT FOR SPANGLES AND OTHER MEMBERS OF FLEXIBLE RESILIENT MATERIAL

Leo J. Kelly, Jr., Chicago, Ill.

Application November 1, 1954, Serial No. 465,890

3 Claims. (Cl. 59—80)

This invention relates to a fastener joint for flexible resilient members such as plastic spangles. More specifically, the invention relates to a fastener joint for such members of flexible resilient material which may readily be assembled and disassembled without the use of tools or of thread, adhesives, or other auxiliary fastening means. The fastener joint of the present invention is particularly designed for the fastening of members of flexible resilient sheet materials, particularly sheet plastics, formed by simple stamping or die-cutting operations. As will be understood by those skilled in the art to which the invention pertains, both from their knowledge of the art and from the discussion and description contained in this application, the term "flexible resilient sheet material" as herein used is descriptive of sheet materials which may readily be bent by mere finger forces but which return to their flat condition upon withdrawal of such forces.

In its most specific aspects, the present invention concerns a spangle having a plurality of fastener portions so as to be adapted to be joined to a series of similar spangles to form a unitary article of jewelry, such as a bracelet or necklace. Heretofore, in the forming of ornamental spangles into items such as bracelets and necklaces, it has been common to provide a series of holes in each spangle, the spangles being joined by the looping of thread or wire through the holes. Spangles for this purpose are formed from flat sheet stock of flexible resilient material. At one time, spangles, both for the ornamentation of clothing and for the fabrication of jewelry, were formed of thin resilient metal. In more recent years, however, because of considerations of expense and also of variety and durability of the finish, spangles are commonly made of a plastic material of appropriate thin gauge. The making of bracelets and necklaces of spangles has recently become popular as a home and hobby activity. But the spangles heretofore provided for this purpose have created substantial difficulties in the fabrication of jewelry therefrom.

In order that they may be fabricated at a minimum of cost, the spangles or links must be of a completely flat construction, in order that they may be formed from sheet materials with the simplest type of cutting operation. Since there was no completely satisfactory way of joining such spangles or links without auxiliary fastening means, it was heretofore the practice to join the spangles by means of thread or wire. Not only were such operations tedious and time-consuming, but in addition the looping of the threads or wires through the spangles substantially impaired the appearance of the completed assembly. Thus the universal practice prior to the present invention was to use the bracelet or necklace thus formed as a mere base for ornamentation, ornaments such as colored "stones" and facsimiles of flowers being sewed to the assembly, partially for the purpose of ornamentation, and partially for the purpose of covering the unsightly appearance of the threads or wires used for joining the links. The present invention provides a spangle or link for the fabrication of items of jewelry such as bracelets and necklaces which does not require any auxiliary fastening means, such as thread, wire, adhesive, etc., and which may readily be assembled in a manner requiring the expenditure of only a small fraction of the time and effort heretofore required to join such spangles. The spangle of the present invention, in addition to greatly simplifying the assembly to similar spangles, also eliminates the unsightly appearance created by the fastening means heretofore used. Although the spangles of the present invention permit the assembly of items of jewelry which require no further ornamentation in order to conceal the unsightly fastening means heretofore employed, the structure of the spangle hereinafter to be described affords the further advantage of providing in a simple manner for the attachment of ornaments, either by employing conventional fastening means for fastening the ornaments to the spangles, or by providing the ornaments with fastening members or portions similar to the fastening members or portions on the spangles.

In providing spangles for the purposes above described, there are also provided fastening means and members which may be employed in the joining of articles of flexible resilient materials other than spangles, the fastener joint of the invention being usable in a variety of applications to join members consisting wholly or partially not only of flat sheet plastics, and of thin metals, but also of paper, cardboard, spring-wire, and many other flexible resilient materials, both in the fabrication of items of jewelry, and in the fabrication of a large variety of other items, both of an ornamental and utilitarian nature.

The invention will best be understood by consideration of the particular embodiments thereof described in the drawing, in which:

Figure 6 is a fragmentary view of a modified fastener member or portion made in accordance with the invention;

Figure 7 is a fragmentary view of a modified spangle made in accordance with the invention;

Figure 8 is a view in elevation of another type of member embodying the fastener joint of the invention;

Figure 9 is a view in elevation of a further member or link embodying the teachings of the invention; and Figure 10 is a view in elevation of a further member of flexible resilient material embodying the teachings of the invention.

Figure 1:
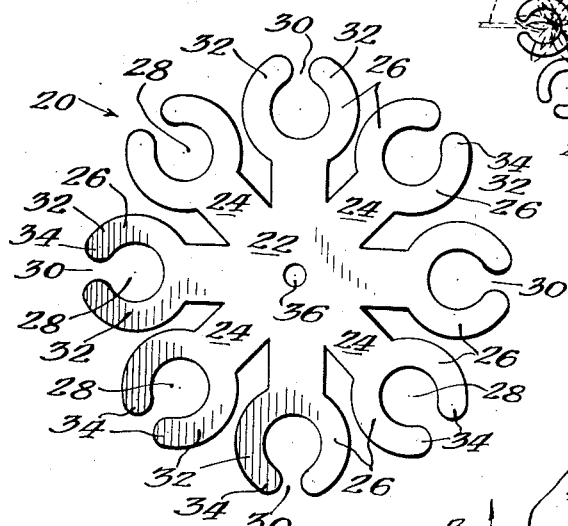
Figure 1 is a top plan view of a plastic spangle embodying the invention.

Referring first to the embodiment of Figure 1, the generally circular spangle, designated 20, is formed by die-cutting from a flat sheet of thin-gauge plastic material. Radially extending from the central or body portion 22 are eight equally spaced shank portions 24 to form a generally star-shaped spangle. At the outer ends of the shank portions 24 are enlarged portions 26, generally circular in outline. The enlarged portions have therein circular apertures 28 concentric with the circular outlines of the enlarged portions 26. The outermost portions of the rings into which the enlarged portions 26 are thus formed are cut away to form mouths or access openings 30 to the apertures 28, the access openings 30 being in radial alignment with the shank portions 24, thus forming pairs of arcuate prongs 32. The diameters of the circular apertures 28 are slightly greater than the transverse dimension or width of the shank portions 24. The access openings or mouths 30 are narrower than the widths of the shank portions 24, but the width of the mouths 30 is substantially greater than the thickness of the shank portions 24 (i.e., the thickness of the material from which the spangle is cut). The ends of the prongs 32 are rounded to semi-circular form at 34. The center of the body portion 22 is apertured at 36.

Figure 2:
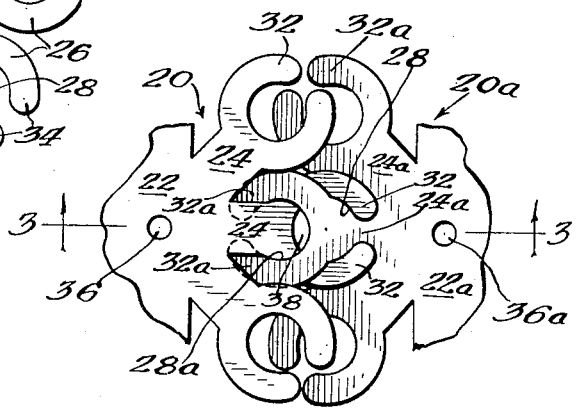
Figure 2 is a fragmentary top plan view of a joint between two spangles of the type shown in Figure 1.
Figure 3:
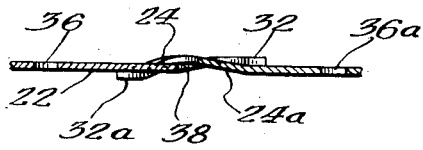
Figure 3 is a fragmentary sectional view taken along the line 3—3 of Figure 2.

In Figures 2 and 3 is shown the manner in which two of the spangles shown in Figure 1 are joined together or interlocked, one of the spangles being designated by the numeral 20 and the other by the numeral 20a, the portions of the spangle 20a bearing the same reference characters as the portions of the spangle 20 except for the addition of the letter "a." As seen in Figures 2 and 3, the spangles 20 and 20a are interlocked by the interengagement of one of the fastener portions of the spangle 20, consisting of the shank portion 24 and the prongs 32, with a corresponding fastener portion of the other spangle 20a, consisting of the shank portion 24a and the prongs 32a. The shank portion 24 of the spangle 20 extends through the eye aperture 28a formed by the prongs 32a. The shank portion 24 is locked into the eye aperture 28a by reason of the enlargement formed at the outer end of the shank portion 24 by the prongs 32. Reciprocally, the shank portion 24a of the spangle 20a extends through the eye aperture 28 formed by the prongs 32 and is locked therein by the enlargement formed by the prongs 32a. Thus each shank portion extends through the opposite eye aperture to mutually and reciprocally interlock the spangles.

Figure 4:
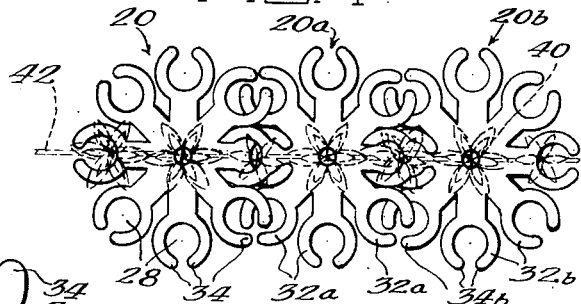
Figure 4 is a top plan view in elevation showing a series of the spangles of Figure 1 joined to form a unitary assembly, ornaments added thereto being shown in dotted form.

It will be noted that in the illustrated embodiment the interlocking fastener portions are of dimensions such that when two adjacent spangles are interlocked by the engagement of one fastener portion of one spangle with a fastener portion of the other spangle, there is formed by the intersection of the circular eye apertures 28 and 28a an aperture 38 bounded by arcs of the intersecting circular apertures, and in alignment with the central apertures 36 and 36a in the spangles. Thus when a series of such spangles are joined together (as shown in Figure 4) there appear along the length thereof apertures of the type indicated at 36 and 36a, alternated with apertures of the type indicated at 38, thus producing in the assembled series of spangles a line of equally spaced apertures, which may conveniently be used for attachment, by thread, wires, or other fastening means, of beads, "stones," flower forms, or similar ornamentation. In Figure 4, which illustrates the manner in which a series of spangles 20, 20a, and 20b are joined together to form a bracelet (commonly provided at the ends with suitable cooperating clasp members, not illustrated), there are shown schematically, in dotted form, simulated flowers 40 secured to the bracelet by threads 42. It will be noted that in addition to the apertures 38, formed by the interlocked and overlapping prongs 32 and 32a, the eye apertures 28 which are not employed in the joints with adjoining spangles may also be used in the securing of additional ornamentation to the spangles.

For purposes of simplicity, the illustration of Figure 4 shows only a most basic type of assembly which may be formed of spangles like the spangle 20 shown in Figure 1, namely a single-row bracelet. However, many other types of assemblies may be formed. Thus multiple-row bracelets may be formed by interlocking, along the edges, single-row structures such as shown in Figure 4. Likewise, structures other than jewelry items may be thus formed, as, for example, belts, purses, and many other items of ornamental or utilitarian value. Further, the ornamentation of the spangles need not be added with the aid of thread or wire, but the ornaments may be provided with fastener portions similar to the fastener portions of the spangles and fastened to the spangles in a manner similar to the manner in which the spangles are mutually fastened, either with the shank portions extending oppositely from the joint, as in Figure 2, or with the shank portions of the ornamentation overlying the shank portions of the spangles (not illustrated). However, it will be noted that in the last-mentioned case, rigidity of the fastening may be assured only by fastening the ornament at a plurality of places, since the mutual and reciprocal interlocking of a single joint is not obtained.

Assembly of the spangle structure of Figures 1 through 4 is, as will readily be seen, extremely simple. The first step in assembly is to insert the shank portion of one fastener member into the eye aperture of the other fastener member, through the access opening 30. The extending prongs are then manipulated to engage the opposite shank portion to complete the assembly. The first portion of the assembly is simply performed with virtually any shape of eye aperture 28 and enlarged portion 26. However, in completing the second portion of the assembly, the circular configuration of the eye apertures and of the enlarged portions (forming the prongs) is found to be extremely important in facilitating the completion of the assembly without jamming or permanent deformation of the plastic spangles. The circular configuration permits mutual sliding rotation of the spangles being joined which makes possible the engagement of the prongs with the opposite shank portion with a minimum of bending or forcing. The ease of assembly provided by the circular eye apertures 28, 28a, etc., may be partially obtained with other curved or arcuate forms such as ovals, etc., permitting more or less free sliding rotation of the first-assembled shank portion in the eye aperture of the opposite fastener member. However, unless other shapes are considered desirable for purposes of appearance, the circular apertures shown, concentric with a circular periphery of the enlarged portions 26, to form prongs 32 in the shape of arcs of a circle, are most desirable from the standpoint of simplicity of assembly.

As pointed out above, the eye apertures 28 are slightly greater in diameter than the width of the shank 24. For best rigidity of the joint coupled with optimum ease of assembly, the width of the shank should be from three-fourths to fifteen-sixteenths of the diameter of the eye aperture. The shape and size of the outer peripheries of the enlarged portions 26 is of lesser importance, being of significance primarily in determining the existence and dimensions of apertures 38 after assembly. As one example of the relative dimensions which may be employed, the width of the shank portions may be seven-eighths of the diameters of the eye apertures, and the enlarged portions may be of a diameter twice the width of the shank portions, these relative dimensions being employed in the illustrated embodiment.

Figure 5:
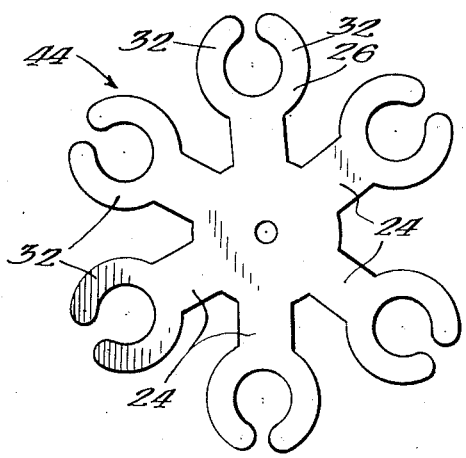
Figure 5 is a plan view of a modification of the spangle of Figure 1 particularly adapted for the assembly of necklaces and similar curved items.

In Figure 5 is shown another embodiment of the invention specifically designed for the formation of curved forms, such as necklaces. It will be seen that the interlocking arrangement as shown in Figures 1 through 4, and described above, permits very little relative rotation of the joined spangles in the plane of the spangles after completion of assembly, a feature which is of considerable advantage when compared to structures wherein the spangles are joined in such a manner as to permit free relative rotation in the plane of the spangles, as would be the case, for example, if the joint were made using only one set of prongs engaging only one shank portion. This rigidity, which is obviously highly desirable in forming most articles, creates a problem where it is desired to join the spangles to form a gradually curved assembly such as a necklace. The spangle of Figure 5 is designed particularly for this purpose. The fastener portions, consisting of the shank portions 24, and enlarged portions 26 in the form of arcuate prongs 32, are identical in Figure 5 with those illustrated in Figures 1 through 4. However, in the device of Figure 1, all of the fastener portions are spaced by equal angular intervals, and opposite fastener portions are exactly aligned along the diameter of the spangle. In the device of Figure 5, however, oppositely disposed fastener portions do not lie exactly along a diameter, but are slightly angularly displaced, the angle therebetween between 165 degrees and 177 degrees (rather than 180 degrees, as in Figure 1), so that the joining of successive spangles 44 produces a gradually curved assembly, the curvature being maintained by the resistance of the interlocking structure described in connection with Figures 1 through 4 to relative rotation of the spangles in the plane of the structure. It will be noted that a curved assembly such as a necklace, thus formed, will maintain its gradually curved shape even though a weight, such as a locket or other ornament, is secured at one point thereon, as is frequently done with items such as necklaces. Many other applications of the structure shown in Figure 5 will be obvious, particularly in view of the utilities discussed above for the device of Figure 1.

Many variants of the spangle illustrated and of the fastener joint therefor may be designed. In Figure 6 is illustrated a form of fastener member which is basically the same as that shown in the portions of the drawing thus far mentioned, additional webs 36 being added, connecting the prongs 32 to the body of the spangle or other article upon which the fastener member is formed. It will be seen that this variant, although somewhat sacrificing ease of assembly, nevertheless employs the basic structure of the invention. In Figure 7 is shown fragmentarily a spangle similar to that of Figure 5, designated 48, webs 50 being added to interconnect the prongs 32, thus giving the spangle a more circular, rather than star-shaped, configuration.

It will be readily recognized that the spangles shown in Figures 1 through 5 constitute only one application of the fastener joint for members of flexible resilient material which is employed therein. The fastener joint is of general utility in fastening members of flexible resilient material. Where two or more fastener portions of the type described are provided on a single member, the member is obviously adapted for the assembly of three or more such members for the purpose of forming a continuous chain. However, in some applications of the fastener joint, only one fastener portion may be provided, so that only two members incorporating such portions are to be joined.

Figures 8, 9 and 10 show various shapes of members illustrative of the infinite variety of shapes with which the present fastener joint is useful, either in the assembly of jewelry and other decorative items, or in other applications of an ornamental or utilitarian nature. In the device of Figure 8, the body portion 52 is triangular, two of the shank portions 24 being in alignment, and the third shank portion being at right angles to the line formed by the first two. Such a structure is useful in the formation of T-shaped joints for various purposes. In Figure 9, the body portion 54 is a curved strip. In Figure 10, the body portion 56 is rectangular, and fastener portions are provided all along each edge, thus providing for the assembly of sheet structures of great strength. Similarly, many other applications of the fastener joint may be seen, with various shaped body portions, and in some cases without body portions, the shank portions merely extending radially from a point.

It will be clear from the description given above and from a study of the illustrated embodiments that a large variety of modifications of the particular embodiments of the invention illustrated in the drawing and described above may readily be designed by persons skilled in the art. Many of such embodiments will of course be far different in appearance from the particular embodiments herein described. Nevertheless, despite such differences in appearance, such modifications will utilize the basic teachings of the invention. Accordingly, the scope of the patent protection to be afforded the invention shall not be deemed to be limited by the particular embodiments herein disclosed, but shall be limited only by the appended claims.

What is claimed is:

1. A linked structure suitable for ready assembly by mere finger manipulation comprising at least three links each consisting of a member of flexible resilient material having at least a pair of substantially identical linking portions, each linking portion comprising a shank terminating at the outer end thereof in an enlarged portion, the enlarged portion having formed therein an eye aperture in alignment with the shank and having an access opening to the periphery of the enlarged portion, the eye aperture being of larger transverse dimension than the shank and the access opening being of smaller transverse dimension than the shank, each member of each adjacent pair of links having the shank and eye of one linking portion mutually and reciprocally engaged with an eye and shank of a linking portion of the other member of the pair, each linking portion consisting of planar sheet material free of bends exceeding the elastic limit of the planar material.

2. The linked structure of claim 1 wherein at least one of the links has substantially opposite linking portions slightly angularly displaced, to form a gradually curved substantially plane assembly.

3. The linked structure of claim 1 wherein each link has at least three linking portions, so that the linked assembly may extend in a plurality of directions.

References Cited in the file of this patent

UNITED STATES PATENTS

| 190,305 | McCormick | May 1, 1877 |
| 375,205 | Sheldon | Dec. 20, 1887 |
| 2,070,362 | Kreutz | Feb. 9, 1937 |
| 2,169,265 | Mantz | Aug. 15, 1939 |
| 2,446,120 | Wiswesser | July 27, 1948 |

FOREIGN PATENTS

| 843 | Great Britain | Mar. 25, 1865 |
| 1,079,613 | France | May 19, 1954 |